United States Patent [19]
Dover

[11] Patent Number: 5,893,445
[45] Date of Patent: Apr. 13, 1999

[54] RETURN SPRING FOR A CLUTCH OR BRAKE OF AN AUTOMATIC TRANSMISSION

[75] Inventor: Harry Dover, Dearborn, Mich.

[73] Assignee: Ford Global Technologies, Inc., Dearborn, Mich.

[21] Appl. No.: 08/888,805

[22] Filed: Jul. 7, 1997

[51] Int. Cl.$^6$ ............................................. F16D 25/0638
[52] U.S. Cl. ........................ 192/85 AA; 192/109 R; 188/71.5; 188/73.31; 267/161
[58] Field of Search ........................ 192/85 AA, 70.2, 192/89.25, 109 R, 109 A, 109 F; 188/71.5, 72.4, 73.31; 267/161, 163

[56] References Cited

U.S. PATENT DOCUMENTS

| | | | |
|---|---|---|---|
| 3,237,739 | 3/1966 | Pritchard | 192/89.25 X |
| 3,313,385 | 4/1967 | Förster | 192/70.2 |
| 3,858,698 | 1/1975 | Hause | 192/109 A X |
| 4,934,502 | 6/1990 | Horsch | 192/85 AA |
| 5,305,663 | 4/1994 | Leonard et al. | |
| 5,416,966 | 5/1995 | Boerger, Jr. et al. | |
| 5,429,557 | 7/1995 | Beim | |
| 5,653,322 | 8/1997 | Vasa et al. | 192/85 AA |

FOREIGN PATENT DOCUMENTS

| | | | |
|---|---|---|---|
| 3545842 | 1/1987 | Germany | 192/85 AA |

*Primary Examiner*—Richard M. Lorence
*Attorney, Agent, or Firm*—Frank G. McKenzie

[57] ABSTRACT

First and second sets of friction discs for a clutch or brake of an automatic transmission are arranged alternately on a member, on which one of the sets is drivably engaged with a spline. A Belleville spring having a discontinuous annular outer band is located with a slight radial interference within a groove such that the band is stabilized and held in position to prevent inadvertent dislocation of the friction discs from the clutch member to which they are assembled. A clutch cylinder supports a piston moveable toward the friction discs to engage the clutch and is urged by the Belleville spring out of contact with the friction disc when hydraulic pressure is removed from the cylinder.

3 Claims, 1 Drawing Sheet

RETURN SPRING FOR A CLUTCH OR BRAKE OF AN AUTOMATIC TRANSMISSION

BACKGROUND OF THE INVENTION

1. Field of the Invention

This invention pertains to a hydraulically actuated friction clutch or brake for use in the kinematic arrangement of an automatic transmission. More particularly, the invention pertains to a return spring for returning a piston to a disengaged position.

2. Description of the Prior Art

In a conventional hydraulically actuated clutch or brake of the type used in the kinematic arrangement of an automatic transmission, a piston, moveable within a hydraulic cylinder, is returned to a position out of contact with the friction discs of a clutch or brake assembly by a coiled compression spring or a Belleville spring. In such an arrangement, first and second sets of friction discs and spacer plates are splined to members that are drivably connected when the clutch or brake is engaged when the cylinder is pressurized and are disconnected by operation of the return springs when the cylinder is vented. Typically, snap rings are installed at the axial ends of the friction disc sets or pressure plates to hold the disc sets in a proper position on the member to which they are attached, and to prevent axial movement of the discs beyond the position of the snap rings.

In this arrangement the spring functions solely to return the piston to its disengaged position, and the snap rings limit the extent of axial movement of the friction discs and provide a reaction to the force developed by hydraulic pressure applied to the piston.

It is preferable to limit the number of components in an clutch or brake assembly of this type in such a way as to ensure the assembly is correctly arranged and to facilitate its installation in the gear box.

SUMMARY OF THE INVENTION

It is an object of the present invention to eliminate use of snap rings in a clutch or brake assembly and to incorporate a split Belleville spring so that it directly returns the hydraulically actuated piston to its proper position and functions also to retain the friction discs in position on the clutch member to which they are connected by a spline.

It has been discovered that a spring of this type having its outer band stabilized by being fitted within a groove has a stable, predictable load versus displacement relationship similar to that of a conventional Belleville spring, in which the outer band is circumferentially continuous. The interference fit of the band in a groove retains the spring in a correct position so that the subassembly can be shipped from a supplier to a transmission assembly plant. Furthermore the clutch subassembly of this invention can be readily inspected visually to ensure that the spring is correctly installed. With a clutch subassembly so configured, it can be installed in a gear box easily and without risk of the clutch discs falling from their correct position.

In realizing these objects and advantages a hydraulically-operated clutch assembly according to the present invention includes a hydraulic cylinder; a piston located in the cylinder for displacement; seals for preventing passage of hydraulic fluid between the piston and cylinder; a clutch pack surrounding an axis, located adjacent the cylinder, having a spline, a first set of friction discs spaced mutually and engaged with the spline, a second set of friction discs, a member of said second set located between sucessive members of the first set, a recess located adjacent an end of the spline; an annular spring located in the recess, located for potential contact with the discs, thereby preventing movement of the discs therepast.

DESCRIPTION OF THE PREFERRED EMBODIMENT

Figure 1:
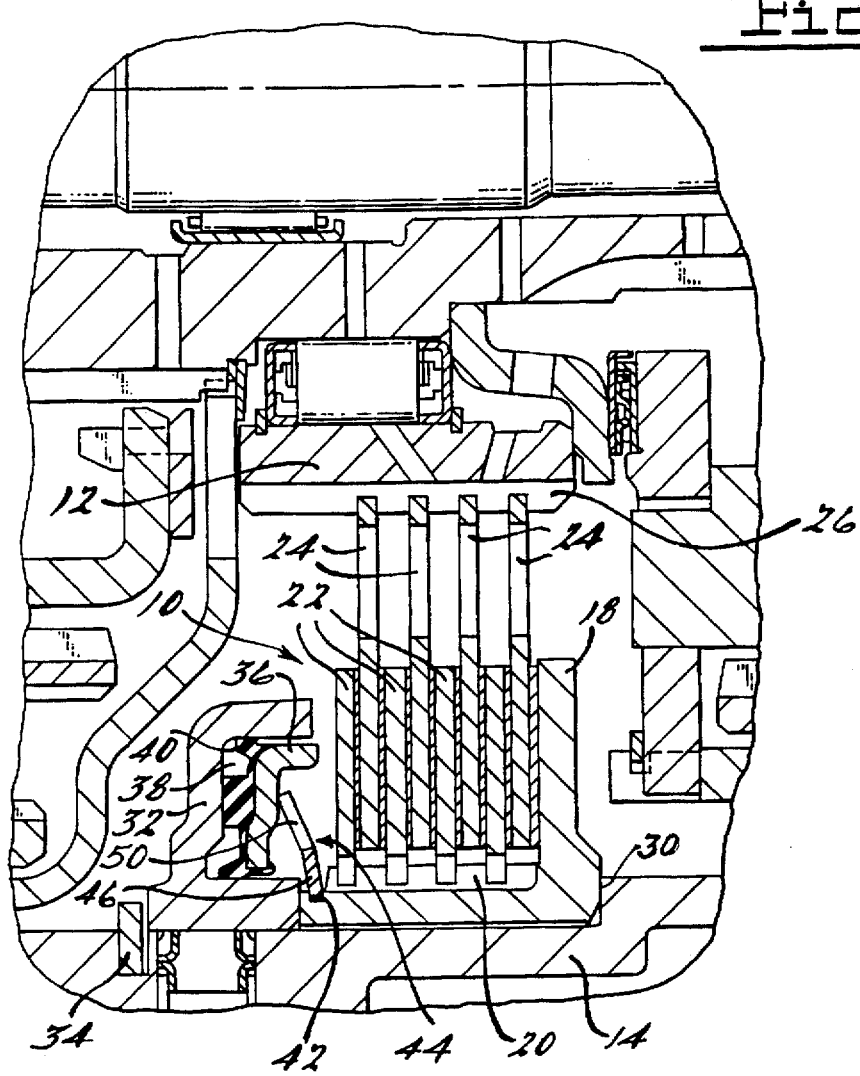
FIG. 1 is a crosssection of a portion of an automatic transmission in the vicinity of a hydraulically actuated friction clutch.

Referring first to FIG. 1, a clutch assembly 10 is adapted to produce a drive connection between a first component 12, such as the outer race of a one-way coupling, and a second component 14, to which the clutch assembly is driveably connected by a spline. The clutch assembly 10, which is arranged substantially symetrically about an axis 16, includes a member 18 having spline teeth 20 directed axially and engaged with a first set of friction discs 22, which are each mutually spaced axially to provide an intervening space between them within which is located a friction disc 24 of a second set of friction discs. FIG. 1 shows the second friction disc set permanently drivably connected through a spline 26 to the outer race 12 as it would be installed in a transmission.

Member 18 is restrained in one axial direction due to contact with a shoulder 30 on component 14 and by contact with an end face of a hydraulic cylinder 32. A snap ring 34 limits movement of cylinder 32 and clutch assembly 10 in the opposite axial direction.

A piston 36, located in cylinder 32 for axial displacement, moves in response to pressurized hydraulic fluid supplied to the piston on a first side of the piston in a space 38 enclosed by a seal 40, carried on piston 36, and adapted to prevent the passage of hydraulic fluid from within the cylinder space 38.

Figure 2:
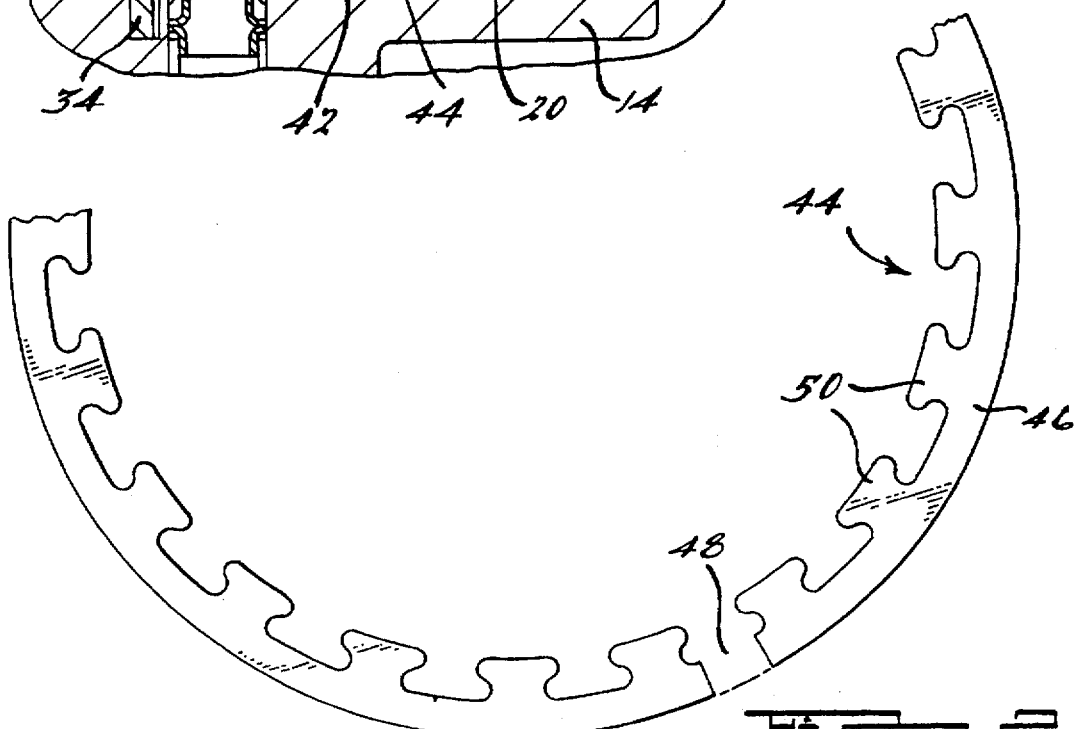
FIG. 2 is a side view of a return spring for the clutch of FIG. 1.

Member 18 is formed with an annular recess or groove 42, into which is fitted a spring 44, preferably a Belleville spring of the type described with reference to FIG. 2. Spring 44 includes a radially outer annular band 46 that is circumfrentially discontinuous due to the presence of a slot 48 that passes entirely through the thickness and width of band 46.

As can be seen in FIG. 1, band 46 is fitted within recess 42 with a slight radial interference so that the band is retained within recess 42, held in its planer disposition, and stabilized against bending normal to its free-state plane, the plane illustrated in FIG. 1. Depending radially inward from the band are tangs 50, which are angularly spaced mutually and located in the plane seen best in FIG. 1.

The first and second sets of friction discs 22, 24 are assembled on clutch member 18 so that the first set of discs 22 are engaged with the spline 20. Next band 46 is fitted with its radially outer surface seated within the recess or groove 42 so that tangs 48 extend away from the clutch discs. The slot through band 46 assures that there is virtually no hoop load or stress in the outer band even though there is a slight interference fit between its outer surface and the outer surface of groove 42.

It has been discovered that when a spring of this type has its outer band stabilized by the support of groove 42 it has a stable predictable load versus displacement relationship similar to that of a conventional Belleville spring whose outer band is circumfrentially continuous. The interference fit of band 46 in groove 42 retains spring 44 in a correct position on member 18 so that the clutch assembly can be shipped from a supplier to a transmission assembly plant. Furthermore the clutch assembly with spring 44 installed can be readily inspected visually to ensure that tangs 48 are extended away from the clutch path. With a clutch subassembly so configured, it can be installed in a gear box easily and without risk of the clutch plate falling from their correct position.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

I claim:

1. A hydraulically-operated clutch assembly comprising:

a hydraulic cylinder;

a piston located in the cylinder for displacement;

seals for preventing passage of a hydraulic fluid between the piston and cylinder;

a clutch pack located adjacent the cylinder, having a spline, a first set of friction discs spaced mutually and engaged with the spline, a second set of friction discs, a member of said second set located between successive members of the first set, a recess located adjacent an end of the spline;

an annular spring located in the recess, located for potential contact with the piston, preventing movement of the discs therepast, having a radially outer, annular band having thickness and width, the band located in the recess, disposed in a plane, the band having a slot that passes through the entire width and thickness of the band, and tangs spaced mutually angularly, extending radially inward from said band, inclined with respect to the plane of said band.

2. The assembly of claim 1, wherein the spring contacts the piston and elastically resists movement of the piston toward the clutch pack.

3. A clutch assembly comprising:

a clutch pack surrounding an axis, having a spline, a first set of friction discs spaced mutually and engaged with the spline, a second set of friction discs, a member of said second set located between successive members of the first set, a recess located adjacent an end of the spline; and an annular spring located in the recess, preventing movement of the discs therepast, having a radially outer, annular band having a thickness and width, the band located in the recess, disposed in a plane, the band having a slot that passes through the entire width and thickness of the band, and tangs spaced mutually angularly, extending radially inward from said band, inclined with respect to the plane of said band.

* * * * *